(12) United States Patent
Hecht et al.

(10) Patent No.: US 6,964,710 B2
(45) Date of Patent: Nov. 15, 2005

(54) METHOD FOR CLEANING OF A MEASURING ELEMENT PASSED OVER BY A GAS FLOW

(75) Inventors: Hans Hecht, Korntal-Muenchingen (DE); Torsten Schulz, Leinfelden-Echterdingen (DE); Thomas Lenzing, Benningen (DE); Klaus Reymann, Gerlingen (DE); Uwe Konzelmann, Asperg (DE)

(73) Assignee: Robert Bosch GmbH, Stuttgart (DE)

(*) Notice: Subject to any disclaimer, the term of this patent is extended or adjusted under 35 U.S.C. 154(b) by 286 days.

(21) Appl. No.: 10/606,329

(22) Filed: Jun. 25, 2003

(65) Prior Publication Data

US 2004/0007245 A1  Jan. 15, 2004

(30) Foreign Application Priority Data

Jul. 15, 2002  (DE) .............................. 102 32 072

(51) Int. Cl.[7] .............................................. B08B 7/02
(52) U.S. Cl. .......................................... 134/16; 134/17
(58) Field of Search ................... 134/1, 16, 17, 134/42; 123/198 A

(56) References Cited

U.S. PATENT DOCUMENTS 4,713,765 A * 12/1987 Abe et al. ................... 701/103
6,502,556 B2 * 1/2003 Wienand et al. ............ 123/478

* cited by examiner

Primary Examiner—Michael Barr
Assistant Examiner—Saeed T. Chaudhry
(74) Attorney, Agent, or Firm—Michael J. Striker

(57) ABSTRACT

A method for cleaning of a measuring element (1) passed over by a gas flow is arranged on a thin-walled membranous material (5). The measuring element (1) includes at least one heatable element (6, 7, 8; 10, 11), which is arranged on the membranous material, the membranous material being capable of vibrating. By means of a control apparatus (20) or a switching (22) associated with the measuring element, a periodic delivery of current (41, 42) in intervals takes place in this manner to at least one heatable element (6, 7, 8; 10, 11) of the measuring element (1) and thereby produces vibrations. Alternatively, vibrations of the membranous material (5) can be produced by special vibration exciters or by means of ultrasonic coupling.

16 Claims, 3 Drawing Sheets

METHOD FOR CLEANING OF A MEASURING ELEMENT PASSED OVER BY A GAS FLOW

BACKGROUND OF THE INVENTION

Heat film-air mass-flow meters are used in motor vehicles, for example, in intake or charger apparatuses of the internal combustion engine. With the chemical process of combustion, the amount of air depending on the mass ratio of fuel and required for combustion is high. Therefore, in the intake apparatus/charging apparatus of the internal combustion engine, the mass flow rate of the intake air/charging air is determined. In addition to volume or dynamic pressure methods, methods that measure mass flow of the air current are also used.

In the intake apparatus of internal combustion engines, today micro-mechanical heat film-air mass-flow meters, which work according to the thermal principle, are also used in part. These are very small and require little space. Heat and sensor resistors are mounted with these very small flow-meters as thin Pt-layers on a chip, which can be made from silicon and serve as a support. On the chip, a mechanically thinned region in the form of a support membrane is applied for thermal decoupling with this type of flow meter. The chip is manufactured by sawing a silicon wafer. The chip encompasses a silicon frame, if necessary, with supports and a sensor membrane with sensor resistors and heat resistors. The center surface region of the membrane represents the sensor element.

A heat resistor of the flow meter is regulated by one or more closely adjacently mounted heat temperature sensors, as well as an air temperature sensor, which is located in an edge region of an SI chip with a large material thickness. With these heat film-air mass-flow meters, the heat flow is not used as the output signal, rather the temperature difference of the gas-type medium to be measured, determined by two temperature sensors, such as, for example, the combustion air, is used. One of the temperature sensors lies in front, that is, upstream, and one of the temperature sensors lies behind the heat resistor in the flow direction of the gas flow to be measured. In contrast to the heat flow, this output quantity again provides the flow with the correct sign, also when it is not in a linear manner.

With applications of a micro-mechanical heat film-air mass-flow meter, under predetermined conditions, contamination of the sensor chip with water, dust particles, or, in the case of use with an internal combustion engine, with motor oil can take place. These types of contamination can affect the sensor signal of the sensor element so markedly, that it no longer lies in the region of the specified tolerances and a premature replacement of the sensor element or the entire apparatus can be required. With cramped proportions in the internal combustion engine, which leads to a minimal distance between the mouth position of a crank housing ventilator in the intake apparatus and the position of the heat film-air mass-flow meter, contamination of the sensor element of the heat film-air mass-flow meter is caused by a deflector grid on the leading edge and an oil condensation grid on the trailing edge. With these features, an increase in robustness of the sensor element of the heat film-air mass-flow meter can be achieved, which however, might not completely exclude a characteristic line drift on the sensor element of the heat film-air mass-flow meter, based on the contamination by oil impingement.

SUMMARY OF THE INVENTION

With the proposed solution of the present invention, a periodic delivery of current to a heating element of the sensor element permits cleaning the support-type membrane, for example, a dielectric membrane, of contamination, such as dust particles, motor oil residue, water drops, and the like in a simple manner, without requiring a separate cleaning device.

The measuring chip arranged on the membrane support and therewith, also the measuring chip, can be stimulated to vibration during a periodic delivery of current of the heating element. By means of the temperature increase resulting from the heating flow, a thermal expansion of the very thin membrane body takes place, on which the measuring elements (resistor) are arranged. Since the membrane on the measuring chip is very thin, a very short, continuous warping or bowing of this membrane can be initiated by various features, which are connected with their internal configurations. One possibility for causing a short, continuous bowing of the membrane is to construct the membrane from multiple layers with different temperature expansion coefficients. A temperature change with this type of membrane by means of the heating of the resistors immediately leads to localized warping. Since the membrane material is very thin, it has a very small heat capacity, so that the warping and its reformation take place very quickly, and take place dependent on the intervals of current delivery and the current delivery pauses of the current supply in the range of milliseconds.

The membranous material accommodating the measuring element within a measuring region also can be stimulated into vibration by means of ultrasonic waves, which can be mechanically coupled in the membranous material or the, measuring chip. Also, with coupling of ultrasonic waves in the sensor element or its measuring chip and support material, a cleaning effect is realized. These ultrasonic vibrations can also be stimulated by separate structures, which additionally are applied to the resistors on the measuring region of the membranous material. In this connection, piezoelectric layers are suitable, for example.

The mechanical expansion of the membranous material accommodating the measuring chip that is produced—brought about by a periodic supply of current in intervals of a heating element or all conductor paths on the upper side of the measuring chip or by coupling or internal production of ultrasonic waves—causes an acceleration of the membranous material with the measuring resistors accommodated thereon in the direction of the upper surface normals. Accelerations in this direction cause a debonding of adhered contaminants from the membranous material as well as from the region of the resistors. By cleaning the membranous material with the resistors attached to the material, the deflection of the measuring signal is significantly reduced over the service life of a micro-mechanical heat film-air mass sensor. The contamination rate of the measuring chip on the upper side of the membranous material can be substantially minimized, whereby a premature replacement of the air mass sensor based on the drift, that is, a characteristic line displacement, can be avoided.

DETAILED DESCRIPTION OF THE PREFERRED EMBODIMENTS

Figure 1:
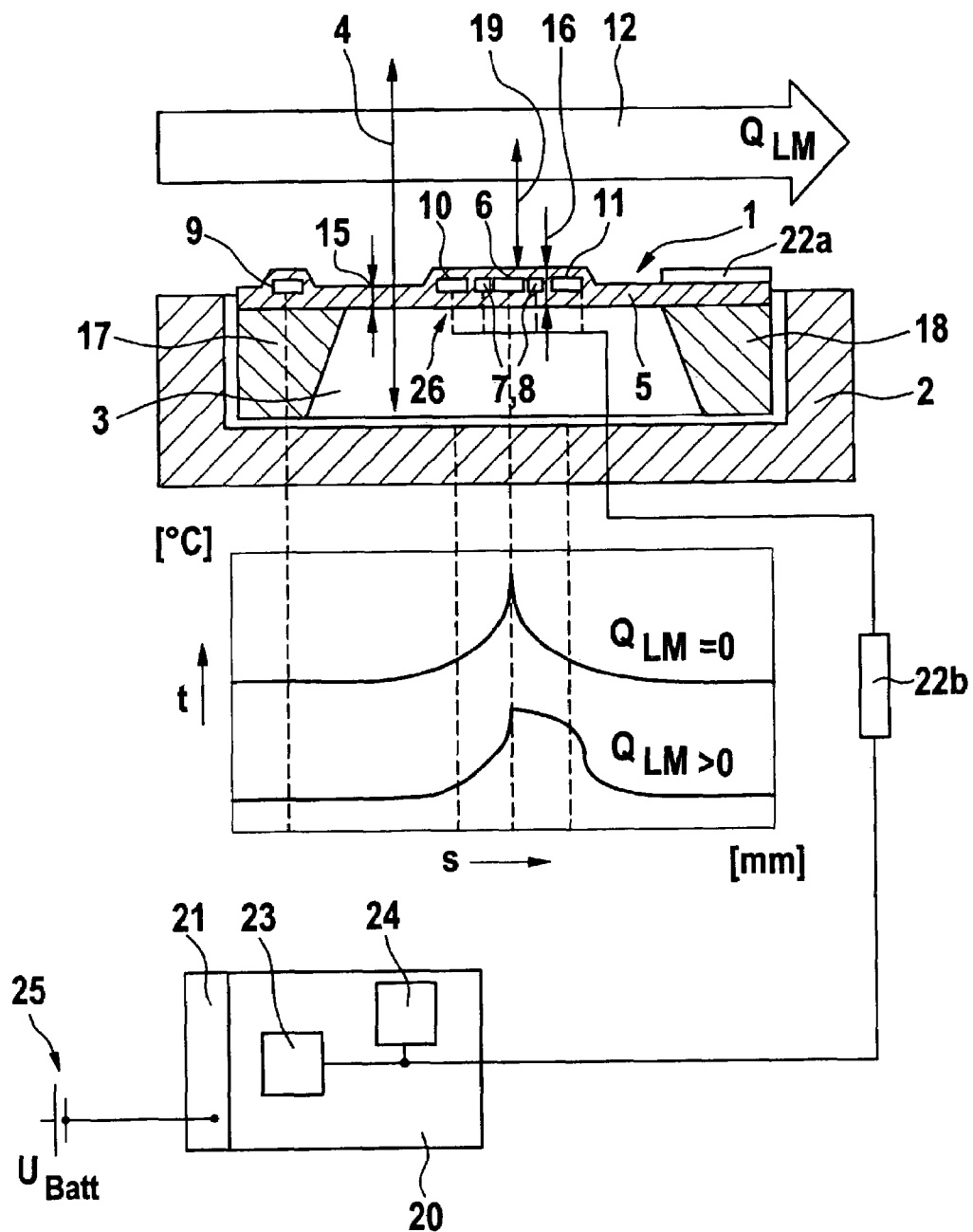
FIG. 1 shows a section through a heat film-air mass-flow meter.

In FIG. 1, a measuring element 1 is shown, which represents a micro-mechanical heat film-air mass-flow meter. The measuring element 1 is the inner region of a membrane 5, which is mounted on the upper surface of a measuring chip 26, whereby between the underside of the measuring element 1 or of its membranous material 5 and the mounting receptacle 2, a free space allowing vibration is formed. The measuring chip is arranged within the mounting receptacle 2. The upper surface normal positioned perpendicular on the upper surface of the membranous material 5 is designated with reference numeral 4. A heat resistor 6 is located on the upper side of the measuring element 1, which is facing toward a gas flow symbolized with arrow 12, such as, for example, the intake air mass flow for an internal combustion engine. The heat resistor 6 can be supplied with voltage via a control apparatus 20, which is connected with an externally arranged voltage source, such as, for example, a motor vehicle battery. On both sides of the heat resistor 6 within the measuring element 1, a first heating temperature sensor 7 and a second heating temperature sensor 8 are provided. For the most accurate detection of the attained heating temperature, which in operation of the flow meter can be heated to temperatures of over 180° C. over the temperature of the intake air, until reaching a maximum value of approximately 300° C., the first heating temperature sensor 7 and the second heating temperature sensor 8 are arranged as close as possible to the heat resistor 6 of the measuring element 1.

The achieved heating temperature is absorbed upstream with reference to the position of the heat resistor 6 and downstream with reference to the position of the heat resistor 6 of the measuring element 1. In a somewhat larger measuring distance, temperature sensors 10 and 11 are arranged on both sides of the first and second heating temperature sensors 7 and 8. Analogous to the arrangement of the heating temperature sensors 7 and 8, one of the temperature sensors 10 is located upstream with reference to the position of the heat resistor 6, while the other temperature sensor 11 is arranged downstream of the heat resistor 6. In addition, the measuring element 1 includes an air temperature sensor 9 arranged on the side of the membranous material 5 facing the air mass flow 12 to be measured.

The membranous material 5, in which the heat resistor 6, the first heating temperature sensor 7, as well as the second heating temperature sensor 8 are accommodated, can be made of different material thicknesses, as shown in FIG. 1; in addition, the membranous material 5 (FIG. 2) can be formed in a generally uniform first material thickness 15.

While the heat resistor 6 and the heating temperature sensors 7 and 8, arranged adjacent to the heat resistor 6, and the temperature sensors 10, 11, arranged at a further distance to the sensors 7 and 8, are provided in an area of the membranous material 5, which is formed with a higher, second material thickness 16, the membranous material 5 has a first material thickness 15 between its support surfaces 17, 18 on the mounting receptacle, which is considerably less than the second material thickness 16. The membranous material 5 can be made from a dielectric material, for example. The first and second heating temperature sensors 7, 8 as well as the temperature sensors 10 or 11 are arranged with reference to the heat resistor upstream and downstream on the upper surface of the membranous material 5.

The free space 3 between the mounting receptacle 2 of the membranous material 5 makes possible its vibration in the direction of the upper surface normals 4 of the membranous material 5 with a periodic supply of current in intervals of the conducting path elements 6, 7, 8 or 10, 11, which are arranged in a region with a second material thickness 16 of the membranous material 5. In addition, a sensor-specific switching 22a, 22b can be provided on the upper side of the membranous material 5 on the side-facing the air mass flow 12 to be measured. While one sensor-specific switching is designated with reference numeral 22a, which is arranged on the upper side of the membranous material 5, the sensor-specific switching 22b can be arranged also displaced from the membranous material 5.

Via the control apparatus 20, which is connected with an external voltage supply and contains an on/off switch 21, a periodic supply of current in intervals to the heat resistor 6 or the temperature sensors 6, 7, or 10, 11 is made possible. In this manner, a periodic delivery of current in intervals of the heating element 6 can take place, as well as a periodic delivery of current in intervals to all conductor paths on the upper surface of the membranous material 5 with temperature sensors 7, 8 or 10, 11 that can be supplied with voltage. A periodic delivery of current in intervals of the conductor path elements 6, 7, 8 or 10, 11 can take place, for example, via sequential on and off switching of the one/off switch 21. In this manner, the elements that are provided with voltage and which are mounted in the membranous material 5 on its upper side, that is, the heat resistor 6 or the heating temperature sensors 7, 8 or 10, 11, are impinged with periodic, changing voltage. The elements mounted on the membranous material 5 and supplied with voltage, such as the heat resistor 6 and the heating temperature sensors 7, 8 and the temperature sensors 10, 11 can be mounted, for example, by means of a spraying process.

In addition to a sequentially occurring on/off switching via the on/off switch of the control apparatus 20, a periodic supply of current in intervals of the conductor path elements 6, 7, 8 or 10, 11 can be achieved, in that by means of a voltage modulator arranged on the control apparatus 20, a periodic delivery of current in intervals can be obtained. Via the control apparatus 20, the conductor path elements 6, 7, 8 or 10, 11 on the upper side of the measuring element 1 can be supplied either individually or in groups with voltage, so that the periodic delivery of current in intervals can be limited or broadened in various areas of the membrane material 5 formed with the second material thickness 16. Instead of the voltage modulator 23, a frequency modulator 24 can be provided within the control apparatus 20, with which, likewise, a periodic delivery of current in intervals of the conductor path elements 6, 7, 8 or 10, 11 can be obtained in the upper side of the membranous material 5.

The components shown in FIG. 1 arranged within the control apparatus 20, namely, the voltage modulator 23 or the frequency modulator 24 also can be integrated or accommodated to be displaced alongside in the sensor-specific switching 22a, 22b on the upper side of the membranous material 5 in the area of the first bearing or the second bearing (see position 22b in FIG. 1). In one embodiment of the method of the present invention, the sensor-specific switching 22 is formed, such that a timer is integrated in it, with which a periodic delivery of current in intervals of one or more of the components 6, 7, 8 or 10, 11 of the measuring element 1 can be obtained. A stimulation for vibration of the membranous material 5 can take place in selected cyclic intervals, in order to remove contaminants from the side of the membranous material 5 facing the air mass flow 12 to be measured, and therewith, from the upper surface of the measuring element 1.

The first heating temperature sensor 7 and the second heating temperature sensor 8 can be formed as conductor paths within the measuring element 1, for example, which have a temperature-dependent, changing ohm resistance. The first heating temperature sensor 7 and the heating temperature sensor 8 are arranged closely adjacent to the heat resistor 6 of the measuring element 1. In operation, that is, with a voltage supply of the heat resistor 6 of the measuring element 1, the heat resistor 6 reaches a temperature of 180° C. over the temperature of the intake air mass flow 12. At the peak, temperatures of 300° C. are reached on the heat resistor 6. By means of a periodic delivery of current in intervals to one, many, or all of the conductor paths with temperature-dependent ohm resistance components, a thermal expansion of the membranous material 5 in the regions on both sides of the measuring element 1 in a first, very thin material thickness 15 can be obtained. By different temperature expansion coefficients within a layered construction of the membranous material 5, localized warping or bowing changes between the membrane upper side and the heating elements 6, 7, 8, 10, 11 arranged on the membrane upper side relative to the membrane underside are possible. As a result, a warping or deflection of the membranous material 5 in the direction of the upper surface normals 4 takes place. When the voltage supply is turned off to one or more of the components 6, 7, 8 or 10, 11 formed as conductor paths with temperature-dependent ohm resistance, the warping or bowing immediately is reshaped. Based on the minimal heat capacity of the membranous material 5 in the areas with very thin material thickness 15, the deflection of the membranous material 5 runs very quickly in the direction of the upper surface normals 4, that is, in the range of milliseconds. In this manner, accelerations, designated with reference numeral 19, are obtained in the direction of the upper surface normals 5, which were constructed on the upper side of the membranous material 5.

Based on the periodic delivery of current in intervals to the heat resistor 6 as well as to one or more of the components 7, 8 or 10, 11 formed as conductor paths with temperature-dependent ohm resistance, periodic vibrations occur on the membranous material 5 in the area with the material thickness 15. Based on the acceleration 19 in the direction of the upper surface normals 4 on the membranous material 5, the vibration of the membranous material 5 affects a debonding of contaminants. By a vibration of the membranous material 5, adhered dirt particles or motor oil residue or water drops can be removed and lead off through the air mass flow 12 passing the measuring element 1.

In a further embodiment, the complete heating of the temperature sensors 7, 8 or 10, 11 formed as conductor paths with temperature-dependent ohm resistance, as well as the voltage supply of the heat resistor 6 can be initiated via a sensor-specific switching 22. The sensor-specific switching 22 is activated in the control apparatus coastdown, that is, after turning off the internal combustion engine and the cooling phase in the intake apparatus beginning at the time point of the engine shut-down. The sensor-specific switching 22a or 22b can be accommodated in an air mass sensor within a separate switching chamber and serves for operating the heater and for amplification of temperature difference signals, which correspond with the air mass flow signal during the operation of the internal combustion engine. After turning off the internal combustion engine, the combined, central ignition and injection control apparatus is still in operation and undertakes various functions. A known time remains still after turning off the engine with the ignition key in operation. This time span can extend from a few seconds to many minutes. The air mass sensor can be maintained likewise in operation in this time frame—initiated by the motor control apparatus—and within a cleaning mode, can activate its internal cleaning circuit.

A periodicity of the voltage supply, as already mentioned, can be conducted by means of a voltage modulator 23 within the control apparatus 20 or within the sensor-specific switching 22. A periodicity of the voltage supply likewise can be obtained via a frequency modulator 24 accommodated in the control apparatus 20 or the sensor-specific switching 22. With both possibilities for implementation, temperature leaps in the millisecond range are possible, by means of periodic current delivery in intervals of the heat resistor 6 or the temperature detection elements 7, 8 or 10, 11, which are made as conductor paths from a material with temperature-dependent ohm resistance. Based on the jumps in temperature achieved in this manner in the membranous material 5, in particular, in its regions that are formed from the first, thin material thickness 15, excitation frequencies of the membranous material 5 can be achieved, which lie in the range of a few hundred hertz. In particular, jumps in temperature can be achieved, which lie in the range of milliseconds, that is, a deflection of the membranous material 5 in the direction of upper surface normals 4 of the membranous material 5 takes place within fractional seconds; likewise, like the retraction of the thin membranous material 5 from its deflected position into its original position upon switching off of the period delivery of current in intervals occurs very quickly. The largest vibration amplitude to which the membrane can be exposed lies in the range of the resonance frequency of the membranous material 5 at approximately 200 kHz.

With the cleaning method of the present invention with the application of a periodic supply of current at intervals of a heat resistor 6 or of temperature sensors 7, 8 and 10, 11, which are formed as conductor paths with temperature-dependent ohm resistance, a cleaning of the measuring element of dust particles, motor oil residue or water drops is achieved, when the measuring element is used in the intake apparatus of an internal combustion engine. With the cleaning performed in this manner, the deflection of the measuring signal is substantially reduced over the service life of the air mass sensor. Since the rate of contamination can be substantially reduced with use of the method of the present invention, a premature replacement of the air mass sensor can be-avoided.

Figure 2:
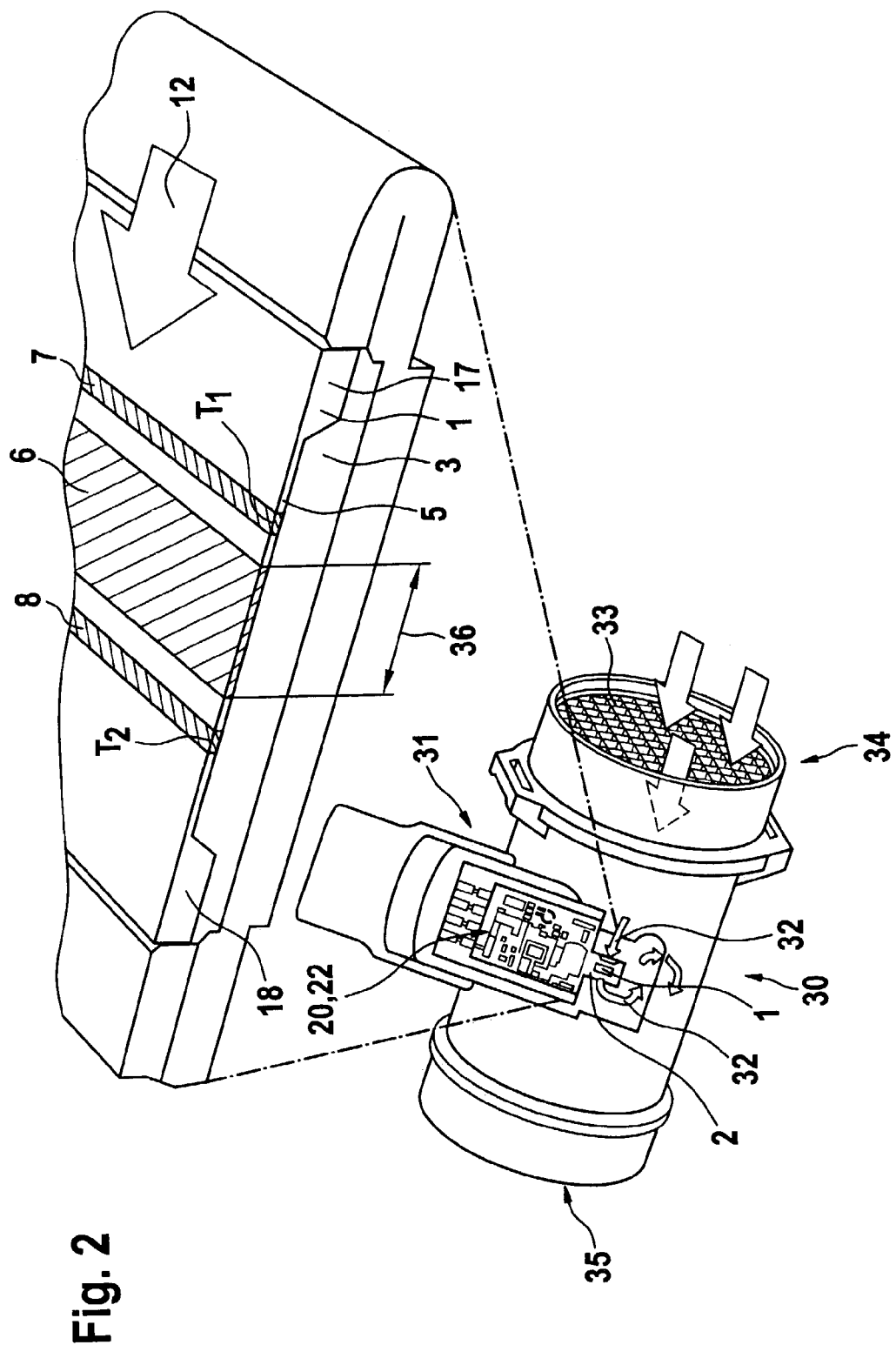
FIG. 2 shows a variation of a measuring element that is supplied with current in intervals, which is integrated in a heat film-air mass sensor and is accommodated on the intake apparatus of an internal combustion machine.

FIG. 2 shows a variation of the a measuring element that can be supplied with a current, which is accommodated in the intake apparatus of an internal combustion engine and which is integrated in a heat film-air mass sensor.

An intake apparatus 30 of an internal combustion engine is represented in FIG. 2 schematically as a cutaway view of an intake manifold line. A heat film-air mass sensor 31 is provided on this intake manifold line, which includes an integrated control apparatus 20 with a sensor-specific switching 22. On the lower end of the control apparatus 20, the mounting receptacle 2 is provided, on which the measuring element 1 is accommodated. The intake air flow that flows past the measuring element 1 is designated with reference numeral 32.

On a leading edge 34 of the intake apparatus 30, shown here as tube-shaped, a grid structure 33 is provided. On a leading edge cross section 35 (not shown) of the tube-shaped intake apparatus 30, likewise, an insert element corresponding to the grid structure 33 can be provided in the flow cross section of the intake apparatus 30.

Above the illustration of FIG. 2 of the essentially tube-shaped intake apparatus 30 of the internal combustion engine, the measuring element 1 is shown in substantially enlarged proportions. The heating zone is designated with reference numeral 36 and lies between a first heating temperature sensor 7 and a second heating temperature sensor 8, which preferably is formed as conductor paths on the sensor element, upstream with reference to the flow direction, while the second heating temperature sensor 8, which likewise is formed as a conductor path, lies downstream of the heating zone 36. The membranous material 5, on which the first and second temperature sensors 7, 8, formed as conductor paths, and the heat resistor 6 are arranged, is formed in the area of these components with a reduced material thickness and defines a free space 3. On a first bearing 17 and a second bearing 18, however, the membranous material 5 has a greater material thickness. The temperature that can be detected by the first temperature sensor 7 is designated with $T_1$; the temperature that can be detected with the second heating-temperature sensor 8, which is arranged downstream of the heat resistor 6, is designated with $T_2$.

Figure 3:
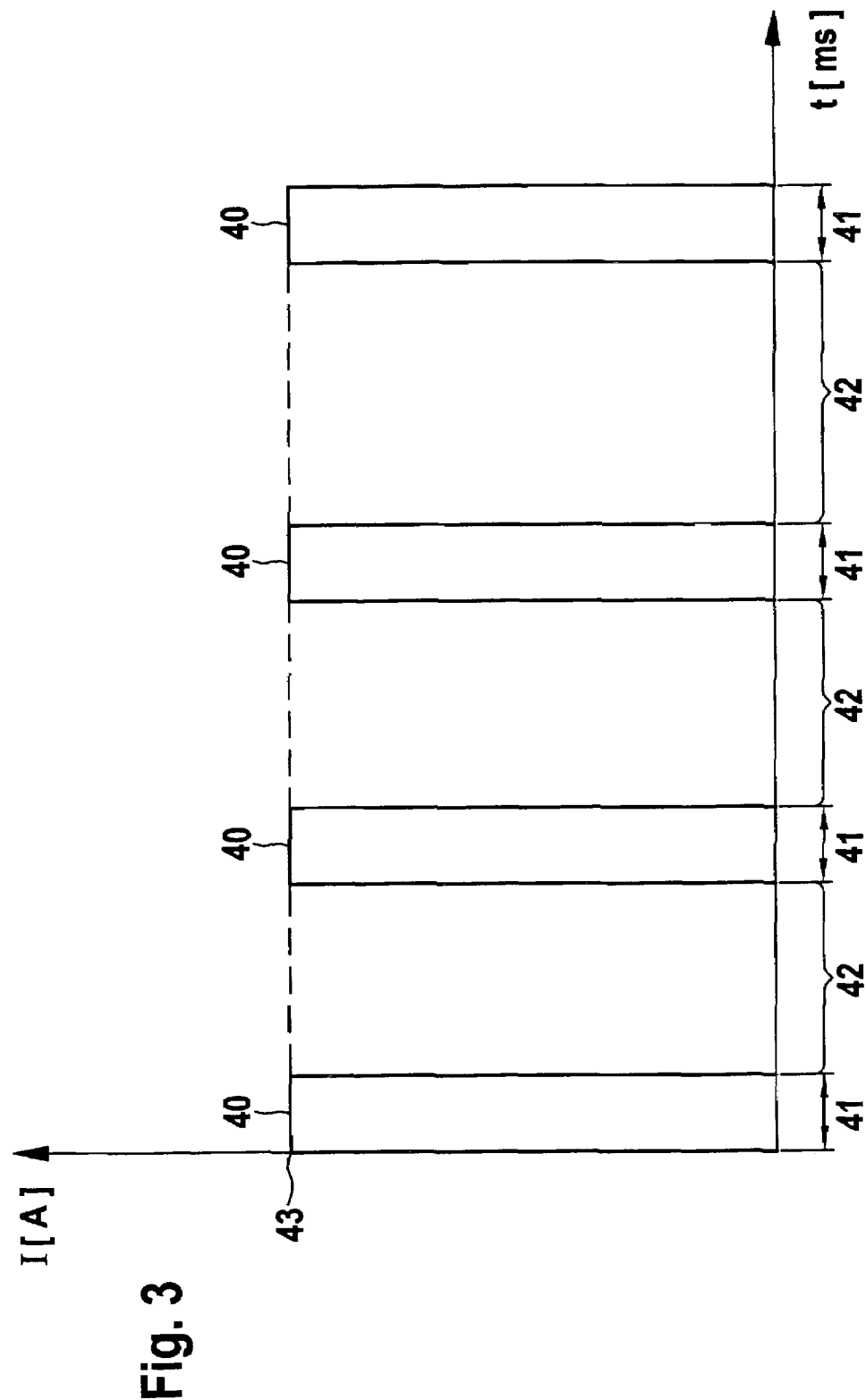
FIG. 3 shows the intervals of current delivery and current delivery pauses of one or more heating elements on the measuring element that can be supplied with current.

In FIG. 3, the current delivery intervals, as well as the current delivery pauses, of one or multiple heating elements formed in the measuring element are shown.

The course of the current supply is plotted over the timeline. A supply of current to the heat resistor 6 of the measuring element 1 takes place during a current delivery interval 40, which has a temporal duration 41. The heating time of the heating element 6 during a current delivery interval 40 amounts to 40 milliseconds, for example. A current delivery pause follows the current delivery interval 40. The duration of the current delivery pause 41 is designated with reference numeral 42 on the timeline. After the shut-down interval 42, which corresponds approximately to double the value of the duration 41 of the current delivery phase 40, a current delivery phase again follows, whose duration 41 amounts to approximately 40 milliseconds. Next, again a shut-down interval of doubled duration 42 follows, similar to the duration 41 of the current delivery interval. During the current delivery interval 40, during which the heat resistor 6 of the measuring element 1 is supplied with current, a current supply level 43 lies on the measuring element 1. This is identical over all of the current delivery phases 40.

The short-time delivery of current 41, 42 in intervals of the heat resistor 6 of the measuring element 1 leads to an excess temperature within the heating zone 36 relative to the surrounding area of approximately 180° C. In this manner, a thermal stratification of an air flow 12 passing over a bypass channel is achieved. Thereby, the oil drops provided in the air or the oil mist in the air is transported away from the heat resistor 6 or vaporized before the measuring element 1. In this manner, an intake of the oil particles in the air onto the upper surface of the measuring element, which occurs with common, longer, uninterrupted delivery of current to the heat resistor 6, can be avoided, which, with the heat film-air mass sensors of the state of the art, takes between 1 and 30 minutes by means of the control apparatus coastdown activated by turning off the internal combustion engine.

The convection turbulence to the left and right near the hear resistor 6 with longer current supply do not occur with a periodic delivery of current 41, 42 in intervals to the heat resistor 6. Based on the convection spiral produced by a longer delivery of current, the contamination of the upper surface of the measuring element 1 would be transported sooner. A delivery of current 41, 42 in intervals to the heat resistor 6 within the heating zone 36 of the measuring element 1 takes place until complete condensation of the oil drops from the air in a time frame of 10 minutes, beginning directly with turning off of the internal combustion engine. The length of the shut-down interval 42 provides the cooling time of the heat resistor 6 and therewith, the time point from which a previous current delivery phase 40 can no longer hold off the oil drops contained in the air from the heat resistor 6 of the upper surface of the measuring element 1. The duration 42 of the shut-down interval between the current delivery phases 40 corresponds approximately to double the value of the duration 41 of the current delivery phase 40.

With the method of the present invention, the contamination of the upper surface of a measuring element 1 by oil or other particles transported in the intake air during the shut-down phase of an internal combustion engine can be avoided with little expense. In this manner, contamination of the upper surface of the measuring element facing the air mass flow 12 $Q_{LM}$, and therewith, an objectionable drift of the characteristic line of the measuring element 1 can be avoided.

It will be understood that each of the elements described above, or two or more together, may also find a useful application in other types of constructions differing from the types described above.

While the invention has been illustrated and described herein as a method for cleaning a measuring element passed over by a gas flow, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims.

What is claimed is:

1. A method for cleaning a measuring element (1), wherein a gas flow (12) flows around the measuring element (1), wherein the measuring element (1) is accommodated in an intake apparatus (30) of an internal combustion engine and is made from a thin membranous material (5), the measuring element (1) including at least one heatable element (6, 7, 8; 10, 11) and wherein the membranous material (5) is arranged in a manner that allows the membranous material (5) to vibrate, the method comprising:

initiating a periodic delivery of current (41, 42) in intervals to the at least one heatable element (6, 7, 8; 10, 11) on the measuring element by means of a control apparatus (20) or a switching (22) of the measuring element (1) for exciting the membranous material (5) into vibrations.

2. The method according to claim 1, wherein the periodic delivery of current (41, 42) in intervals to the at least one heatable element (6, 7, 8; 10, 11) takes place by means of sequential switching on and off (21) of the control apparatus (20).

3. The method according to claim 1, wherein the periodic delivery of current (41, 42) in intervals to all elements (6, 7, 8; 10, 11) of the measuring element (1) that can be supplied with current takes place by means of sequential switching on and off (21) of the control apparatus.

4. The method according to claim 1, wherein the periodic delivery or current (41, 42) in intervals to the at least one heatable element (6, 7, 8; 10, 11) of the measuring element (1) affects an acceleration (19) in a direction of surface normals (4) on the membranous material (5), based on an internal heat expansion ratio over various local heating expansion coefficients of the membranous material (5).

5. The method according to claim 1, wherein sensor-specific switching (22a, 22b) is activated in a control apparatus coastdown after turning off the internal combustion engine and is utilized during this period for cleaning of the membranous material (5).

6. The method according to claim 1, wherein by means of sensor-specific switching (22), an activation of the periodic delivery of current (41, 42) in intervals to the at least one heatable element (6, 7, 8; 10, 11) of the measuring element takes place in predetermined time intervals.

7. The method according to claim 1, wherein the periodic delivery of current (41, 42) in intervals takes place in the control apparatus (20) by means of a voltage modulator (23).

8. The method according to claim 1, wherein the periodic delivery of current (41, 42) in intervals is produced by means of a voltage modulator (23) arranged in sensor-specific switching (22) of the measuring element (1).

9. The method according to claim 1, wherein the periodic delivery of current (41, 42) in intervals is produced in the control apparatus (20) by means of a frequency generator (24).

10. The method according to claim 1, wherein the periodic delivery of current (41, 42) in intervals is produced by means of a frequency generator integrated in sensor-specific switching (22).

11. The method according to claim 1, wherein by means of the periodic delivery of current (41, 42) in intervals of the at least one heatable element (6, 7, 8; 10, 11) or all conducting paths of the measuring element (1), leaps in temperature in the membranous material (5) accommodated in the measuring element are produced.

12. The method according to claim 11, wherein the temperature leaps occurring in a temporal interval of less then milliseconds make possible excitation frequencies of the membranous material (5) of hundreds kHz.

13. The method according to claim 12, wherein the temperature leaps in the membranous material (5) occurring in a temporal interval of less than milliseconds produce maximum vibration amplitudes with a resonance frequency of 200 kHz.

14. The method according to claim 1, wherein current delivery intervals (40) of the at least one heatable element (6, 7, 8; 10, 11) take place with a constant heat flow level (43) and have a first duration (41).

15. The method according to claim 1, wherein current delivery intervals (40) of the at least one heatable element (6, 7, 8; 10, 11) of the measuring element (1) are interrupted by shut-down intervals, wherein a duration (42) of the shut-down intervals exceeds a duration (41) of the current delivery intervals (40).

16. The method according to claim 1, wherein within a heating zone (36) of the measuring element (1), excess temperatures of 180° C. relative to an ambient temperature are produced.

* * * * *